(12) United States Patent
Masuda

(10) Patent No.: US 7,302,171 B2
(45) Date of Patent: Nov. 27, 2007

(54) LENS-FITTED PHOTOGRAPHIC FILM

(75) Inventor: Takeshi Masuda, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 237 days.

(21) Appl. No.: 11/090,848

(22) Filed: Mar. 25, 2005

(65) Prior Publication Data
US 2005/0213955 A1  Sep. 29, 2005

(30) Foreign Application Priority Data
Mar. 25, 2004  (JP) .............................. 2004-090110

(51) Int. Cl.
*G03B 17/02* (2006.01)
*G03B 17/18* (2006.01)
(52) U.S. Cl. .......................................... 396/6; 396/281
(58) Field of Classification Search ................ 396/281, 396/287, 6, 376
See application file for complete search history.

(56) References Cited

U.S. PATENT DOCUMENTS

| | | | | |
|---|---|---|---|---|
| 4,560,261 A | * | 12/1985 | Ueda et al. ................. | 396/336 |
| 5,262,815 A | * | 11/1993 | Aumiller ....................... | 396/2 |
| 6,633,728 B2 | | 10/2003 | Motomura | |
| 2004/0151491 A1 | * | 8/2004 | Coleman et al. ............ | 396/376 |
| 2006/0062556 A1 | * | 3/2006 | Katsura ....................... | 396/6 |

FOREIGN PATENT DOCUMENTS

JP       2000-098486       4/2000

* cited by examiner

*Primary Examiner*—Christopher Mahoney
(74) *Attorney, Agent, or Firm*—Young & Thompson

(57) ABSTRACT

A switch is turned on when a shutter button is pressed down. An LED, provided on the front face of a unit body, is lit up to indicate a photographing moment in response to the turning of the switch on. When the shutter button is released, the switch is turned off and thereby the LED is turned off. In another embodiment, an indication member shifts to indicate the photographing moment in response to the shutter operation.

7 Claims, 6 Drawing Sheets

LENS-FITTED PHOTOGRAPHIC FILM

BACKGROUND OF THE INVENTION

1. Field of the Invention

The present invention relates to a lens-fitted photographic film unit that is capable of indicating a photographing moment.

2. Background Arts

Recently, various types of cameras, such as a lens-fitted photographic film unit and a compact camera, have been on the market. Many of such cameras are provided with flash devices for illuminating subjects by emitting flashlight under photographing circumstances with insufficient light amount. In flash photographing, it is possible for the subject person to know the photographing moment by seeing the flashlight. However, there is a problem in non-flash photographing that the subject person is not able to know whether the photographing is finished or not, since the subject person is not able to know the photographing moment without the flashlight. To solve this problem, a camera disclosed in Japanese Patent Laid-Open Publication Number 2000-98486, for example, indicates the photographing moment by outputting sounds before or at the moment of photographing.

However, this camera disclosed in Japanese Patent Laid-Open Publication Number 2000-98486 increases its manufacturing cost for the necessity of having a sound device therein. Since a moderate price is one of the features of simple cameras such as the lens-fitted photographic film unit having a simple photographing mechanism, it is not a practical solution to provide the simple cameras with the sound output device.

SUMMARY OF THE INVENTION

An object of the present invention is to provide a lens-fitted photographic film unit that is capable of indicating a photographing moment on the subject side in a simple way.

The above object of the present invention and other objects are achieved by indicating the photographing moment in a visible manner from the subject side. The exposure time is too short to be perceived by people, and the photographing moment means the period during and around the shutter operation.

In the first embodiment of the present invention, a light-emitting diode emits light in response to the shutter operation. In the second embodiment of the present invention, an indicating member projects from a unit body in response to the shutter operation. In the third embodiment of the present invention, the color in a display window is changed in response to the shutter operation.

According to the lens-fitted photographic film unit of the present invention, it is possible to indicate the photographing moment on the subject side with a simple constitution, even in non-flash photographing. Furthermore, it is possible to save the power consumption by using a mechanical indicating member.

BRIEF DESCRIPTION OF THE DRAWINGS

One with ordinary skill in the art would easily understand the above-described objects and advantages of the present invention when the following detailed description is read with reference to the drawings attached hereto.

PREFERRED EMBODIMENTS OF THE INVENTION

Figure 1:
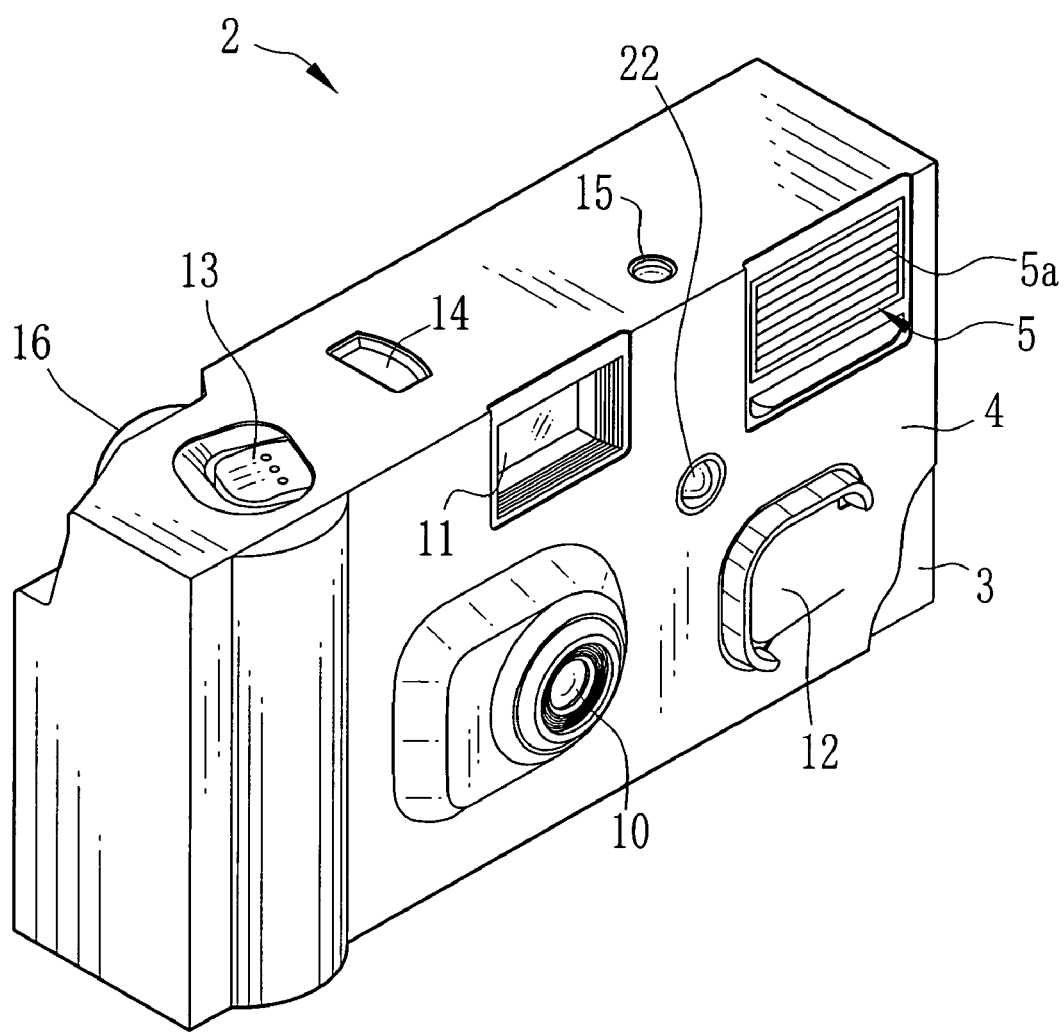
FIG. 1 is a perspective view illustrating a lens-fitted photographic film unit.

As shown in FIG. 1, a lens-fitted photographic film unit 2 comprises a unit body 3 and an outer cover 4 for covering the unit body 3. As specifically described in U.S. Pat. No. 6,633,728, the unit body 3 is provided with a shutter mechanism, a film winding mechanism, and a flash device 5. A roll of an unexposed photographic film and a cartridge are preloaded in the unit body 3 in a manufacturing factory.

The front face of the unit body 3 is provided with a taking lens 10, a viewfinder objective window 11, a flashlight emitting unit 5a, a flash operating member 12, and an LED 22 of an indicator 6 for indicating a photographing moment. The top face of the unit body 3 is provided with a shutter button 13, a counter window 14 for displaying the available frame numbers, and a charging-completion display window 15. A neon lamp 63 (see FIG. 6) is disposed behind the charging-completion display window 15 and lights up when the flash device 5 completes charging.

A part of a winding knob 16 is exposed on the rear face of the unit body 3 to be rotated for every photographing. The outer cover 4 is attached to the unit body 3 and has openings for exposing the taking lens 10, the view finder objective window 11, the counter window 14, and the LED 22 of the photographing moment indicator 6, respectively.

Figure 2A:
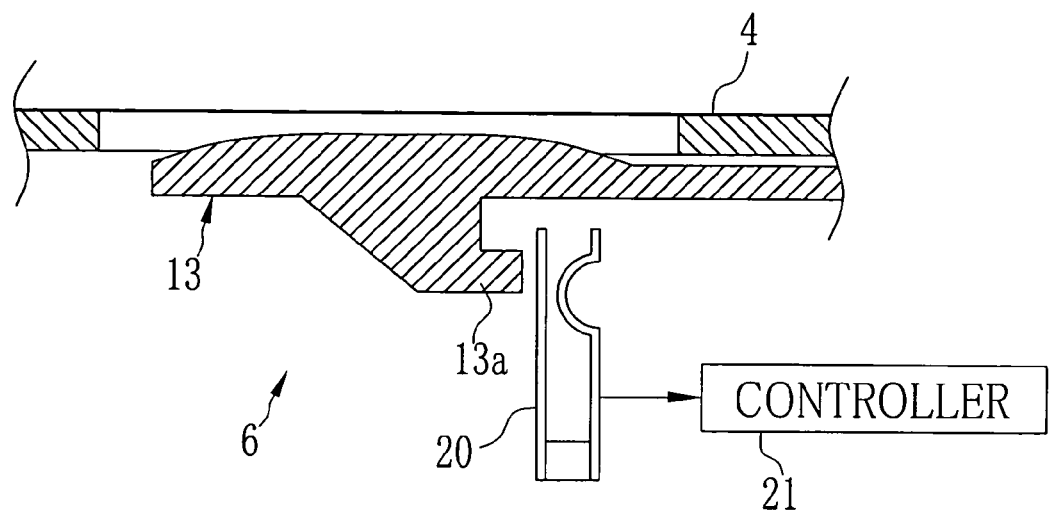
FIG. 2A and FIG. 2B are cross-sectional views illustrating a shutter button before and during operations respectively.
Figure 2B:
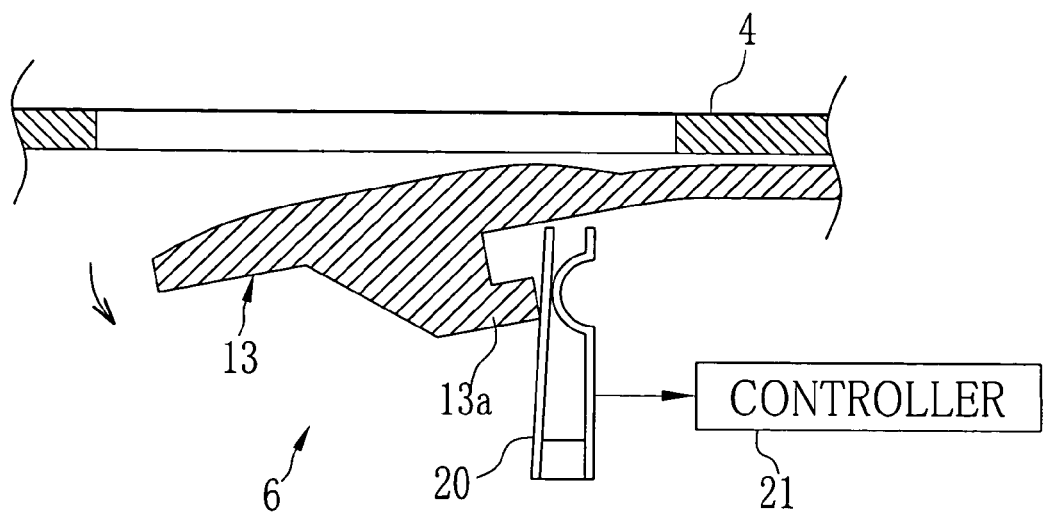

As shown in FIG. 2A, the photographing moment indicator 6 comprises a switch actuating portion 13a, a switch 20, a controller 21, and the LED 22 (see FIG. 1). The switch actuating portion 13a is a projection formed on the lower face of the shutter button 13. As shown in FIG. 2B, the switch 20 is turned on by the switch actuating portion 13a when the shutter button 13 is pressed down. When released from the pressure, the shutter button 13 returns to its original position by its own elasticity. The controller 21 lights the LED 22 up when the flash device 5 is off and the switch 20 is on. In other cases, the controller 21 does not light the LED 22 up.

Figure 6:
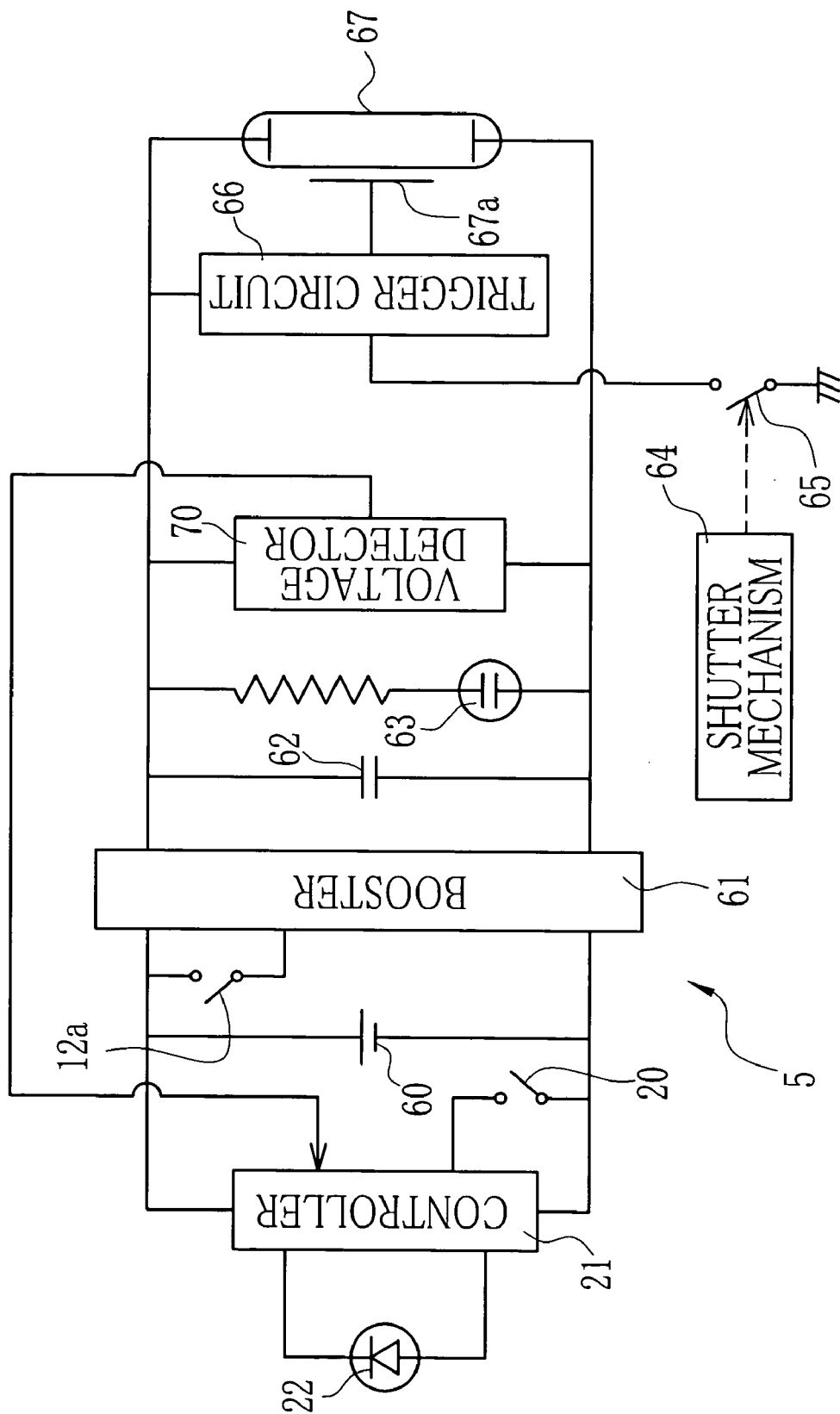
FIG. 6 is a block diagram of a flash device.

As shown in FIG. 6, a flash device 5 is provided with a booster 61 for raising the voltage of a battery 60 to a higher voltage (approximately 300V). The booster 61 starts operating when the flash switch 12a is turned on by the flash operating member 12, and stops operating when a main condenser 62 completes charging. On completion of charging of the main condenser 62, the neon lamp 63 lights up to indicate the completion of the charging.

A shutter mechanism 64 is charged by a film winding operation and released as the shutter button 13 is pressed down. When the shutter mechanism 64 is released, a shutter blade (not shown) starts opening movement, exposing the photographic film. After reaching a full-open position, the shutter blade starts closing movement, returning to the closing position.

A synchro-switch 65 is turned on when the shutter blade reaches the full-open position. In response to that, a trigger circuit 66 is triggered and starts discharging a flash discharge tube 67 by applying trigger voltage to a trigger electrode 67a of the flash discharge tube 67. The flash discharge tube 67 emits flashlight using the electrical energy supplied from the main condenser 62. Since a dark subject is illuminated by the flashlight while the shutter blade opens, the photographic film is appropriately exposed.

A voltage detector 70 detects whether the main condenser 62 is charged up to a predetermined voltage. The voltage detector 70 signals the controller 21 that the flash device 5 is on, if the main condenser 62 is charged, or that the flash device 5 is off, if the main condenser 62 is not charged.

If the switch 20 is turned on in response to the shutter operation after the controller 21 receives the signal indicating that the flash device 5 is off, the controller 21 lights up the LED 22 to indicate the photographing moment to the subject person. The LED 22 goes off when the switch 20 is turned off. On the other hand, after the controller 21 receives the signal indicating that the flash device 5 is on, the LED 22 does not light up even if switch 20 is turned on. In this case, the flash discharge tube 67 emits the flashlight on photographing, and the subject person is able to know the photographing moment.

Since the flash switch 12*a* is turned off in response to the release of the flash operating member 12, it is necessary to operate the flash operating member 12 for every photographing. Therefore, it is preferable to allow the flash operating member 12 to slide between an OFF-position (to turn off the flash switch 12*a*) and an ON-position (to turn on the flash switch 12*a*), and to click-stop at each position. In this case, a second flash switch having the same constitution as the flash switch 12 is provided substituting for the voltage detector 70 and the controller 21. The second flash switch, the switch 20, the LED 22, and the battery 60 are connected in series.

The following is an explanation of operations of the above embodiment. When the winding knob 16 is rotated, a frame of the photographic film is wound up to be ready for photographing. If the shutter button 13 is pressed down when the flash device 5 is not charged in advance, the LED 22 lights up at the same instant as the shutter operation and the flashlight is not emitted. The subject person is thus able to know the photographing moment by seeing the light of LED 22. On the other hand, if the shutter button 13 is pressed down after the flash device 5 completes charging, a flash photographing is performed leaving the LED 22 off. The subject person is thus able to know the photographing moment by seeing the flashlight.

Although the LED 22 is not lit up in the flash photographing in the above embodiment, it is also possible to light the LED 22 simultaneously with the emission of the flashlight. Furthermore, other well-known lighting devices are applicable to the present invention instead of the flash device 5.

It is also possible to dispose the LED 22 in arbitrary positions such as the side face or the top face of the unit body 3, as long as it is visible for the subject person. In addition, not only the LED 22 but also other light sources such as a lamp are applicable as well.

Figure 3A:
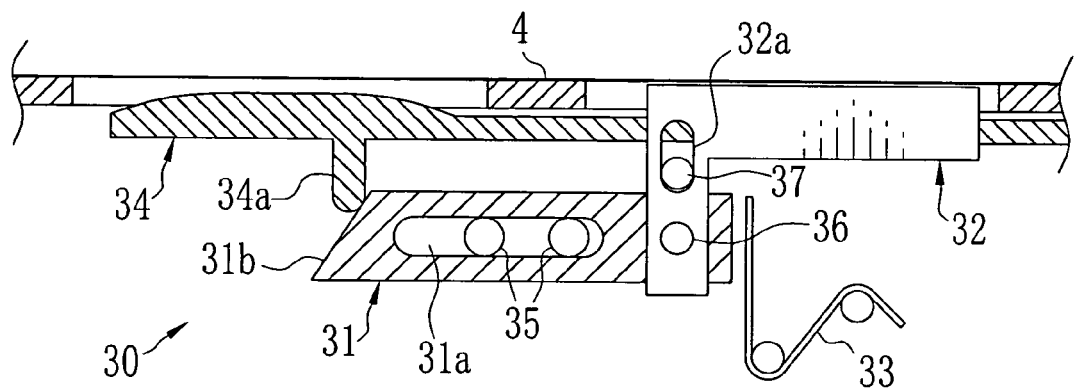
FIG. 3A and FIG. 3B are cross-sectional views illustrating an movement of an indicator.
Figure 3B:
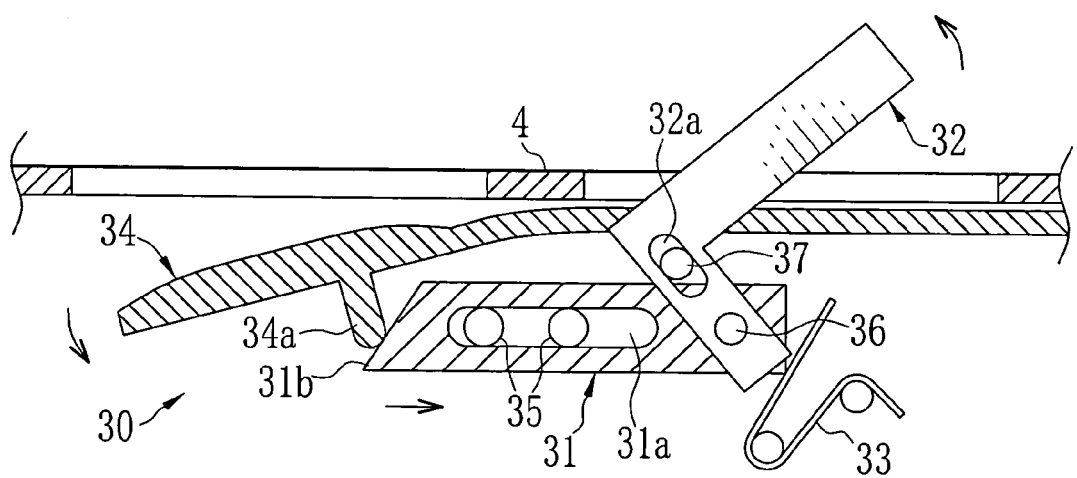

The embodiment shown in FIG. 3A and FIG. 3B mechanically indicates the photographing moment. As shown in FIG. 3A, a photographing moment indicator 30 comprises an operating portion 34*a*, a slide member 31, an indication member 32, and a leaf spring 33. The operating portion 34*a* is a projection formed on the lower face of the shutter button 34. The slide member 31 is provided with a slope in the left end and a groove 31*a* extending from side to side at the center. The groove 31*a* fits to axes 35 that are fixed to the unit body 3. The indication member 32 is L-shaped and swings about an axis 36 provided in the right part of the slide member 31. A vertically extending groove 32*a* is formed on the indication member 32 and fits to an axis 37 that is fixed to the unit body 3. The leaf spring 33 biases the slide member 31 in the left direction.

In response to that the shutter button 34 is pressed down, the projection 34*a* slides downward on a slope 31*b* of the slide member 31, as shown in FIG. 3B. The slide member 31 moves in the right direction against the bias of the leaf spring 33. The indication member 32 swings counterclockwise about the axis 36 from a contained position contained in the unit body 3 to a projecting position projecting on the unit body 3, while the groove 32*a* slides on the axis 37. The photographing is performed simultaneously with or immediately after the projection of the indication member 32, and the subject person is able to know the photographing moment by seeing the projection of the indication member 32. Furthermore, it is possible to add some entertainment by arranging the indication member 32 to burst out of the unit body 3. The shutter button 34 returns to its original position by its own elasticity when released from the pressure. The slide member 31 is shifted in the left direction by the bias of the leaf spring 33, and the indication member 32 thereby rotates clockwise about the axis 37 from the projecting position to the contained position.

Note that it is also possible to form the indication member in arbitrary shapes. In addition, the shift mechanism for the indication member is not limited to the above constitution.

Figure 4A:
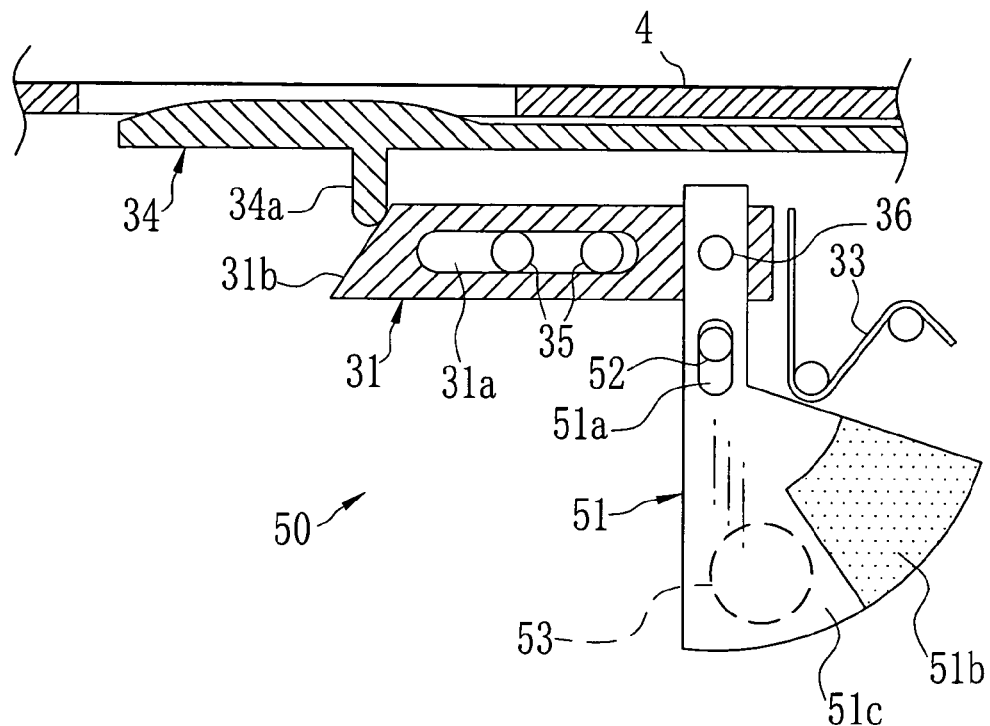
FIG. 4A and FIG. 4B are cross-sectional views illustrating an embodiment to change the color in a display window.
Figure 4B:
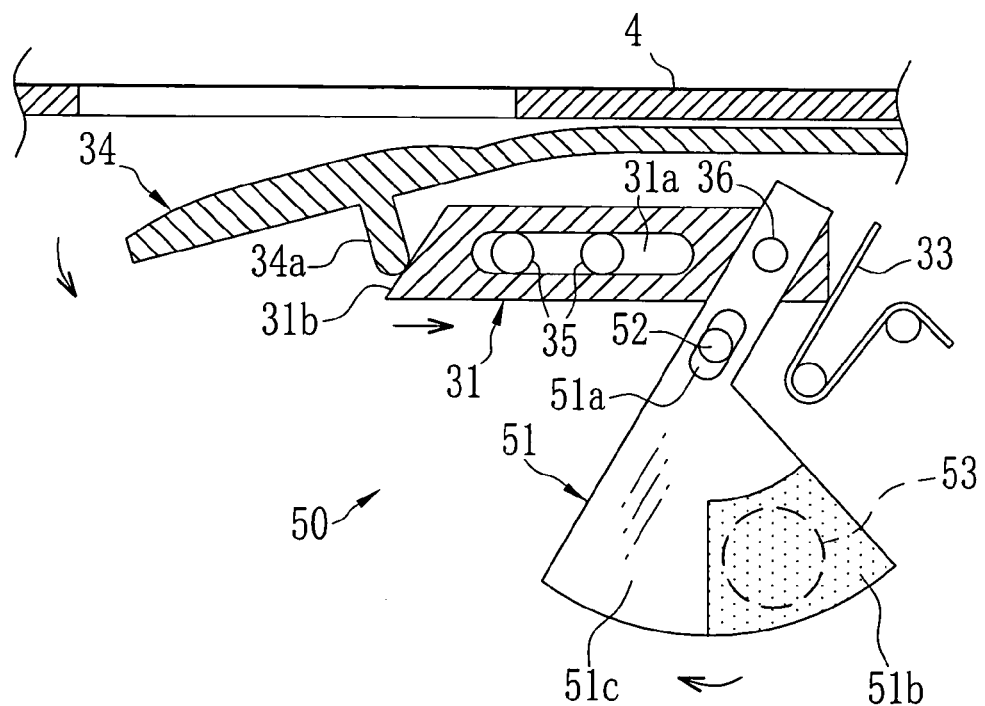
Figure 5:
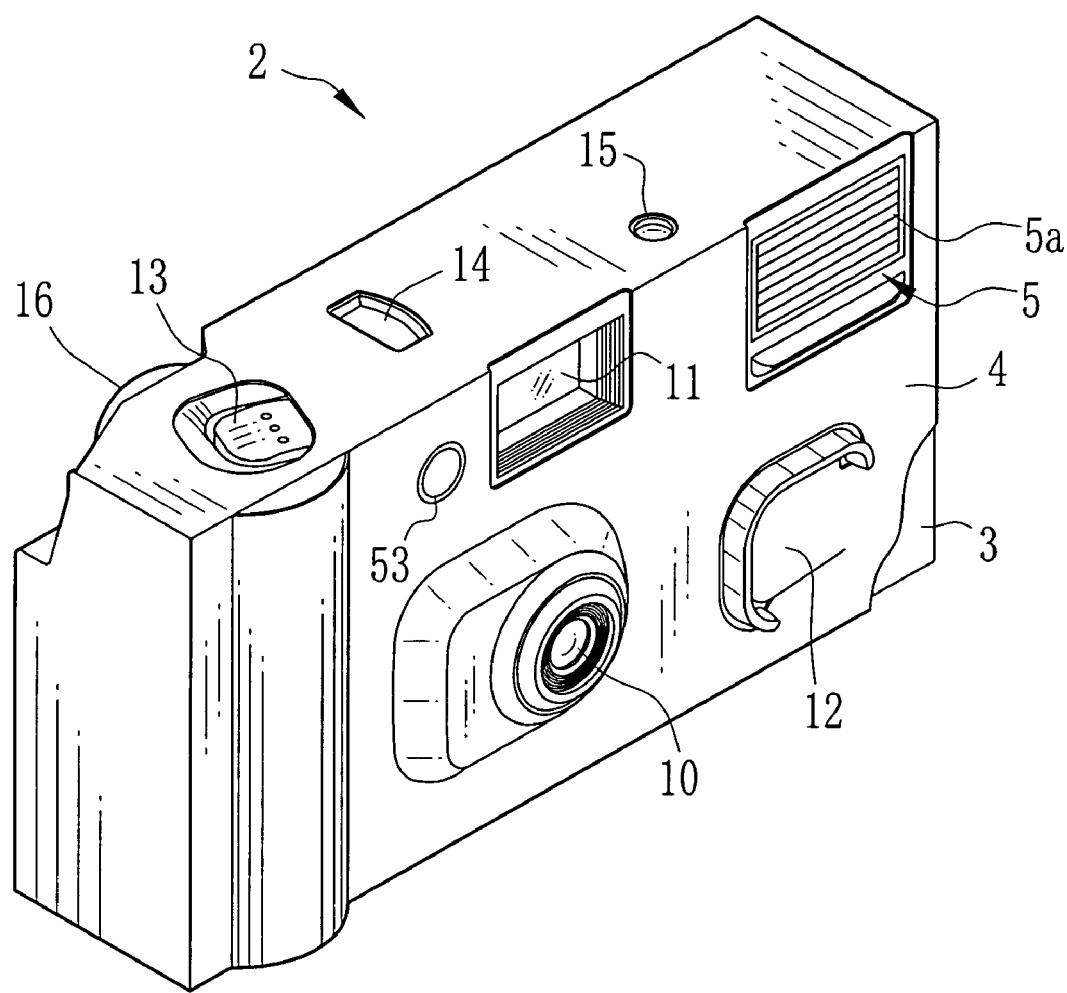
FIG. 5 is a perspective view illustrating the lens-fitted photographic film unit having the display window.

FIGS. 4A, 4B and 5 shows an embodiment to change the color in the display window. As shown in FIG. 4A, a photographing moment indicator 50 comprises the operating portion 34*a*, the slide member 31, an indication sector 51, and the leaf spring 33. The indication sector 51 spreads out in a fan-shape at the lower part and swings about the axis 36 provided on the left part of the slide member 31. A vertically extending groove 51*a* is formed on the indication sector 51 and fits to an axis 52 that is fixed to the unit body 3. An area 51*b* and the outer cover 4 differ in colors, while an area 51*c* that is the entire surface excluding the area 51*b*, and the outer cover 4 are of the same color. As shown in FIG. 5, a display window 53 for displaying a part of the indication sector 51 is provided on the front faces of the unit body 3 and the outer cover 4. The areas to face the display window 53 are shown by the dashed lines in FIGS. 4A and 4B.

When the shutter button 34 is pressed down, the slide member moves in the right direction and the indication sector 51 rotates clockwise about the axis 36, as shown in FIG. 4B. Thereby, the area 51*b* replaces the area 51*c* to face the display window 53. The change of the color in the display window 53 indicates the photographing moment. When the shutter button 34 is released and thereby the indication sector 51 returns to the original position, the area 51*c* replaces the area 51*b* to face the display window 53.

Note that it is possible to arbitrarily color the indication sector 51, as long as the areas 51*b* and 51*c* are of different colors.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A lens-fitted photographic film unit for photographing upon operation of a shutter button provided in a unit body, said lens-fitted photographic film unit comprising:

an indication member shiftable between a contained position contained in said unit body and a projecting position projecting from said unit body, in said projecting position said indication member being visible from a subject side; and a shift mechanism for shifting said indication member from said contained position to said projecting position, in response to the operation of said shutter button.

2. A lens-fitted photographic film unit defined in claim 1, wherein said shift mechanism comprises:

a slide member for shifting between a first position and a second position in response to the operation of said shutter button, said slide member being connected to said indication member in order to shift said indication member from said contained position to said projecting position in response to the shift of said slide member from said first position to said second position; and a spring for biasing said slide member to said first position.

3. A lens-fitted photographic film unit defined in claim 2, wherein said indicator is swingable.

4. A lens-fitted photographic film unit for photographing upon operation of a shutter button provided in a unit body, said lens-fitted photographic film unit comprising:

an opening formed on said unit body to be visible from a subject side;

an indication member shiftably disposed behind said opening and having a first section and a second section of different colors; and a shift mechanism for shifting said indication member in order for said second section to replace said first section behind said opening, in response to the operation of said shutter button.

5. A lens-fitted photographic film unit defined in claim 4, wherein said shift mechanism comprising:

a slide member for shifting between a first position and a second position in response to the operation of said shutter button, said slide member being connected to said indication member in order for said second section to replace said first section behind said opening in response to the shift of said slide member from said first position to said second position; and a spring for biasing said slide member to said first position.

6. A lens-fitted photographic film unit defined in claim 5, wherein said first section and said unit body are of the same color.

7. A lens-fitted photographic film unit defined in claim 6, wherein said indication member is swingable.

* * * * *